Patented Sept. 13, 1949

2,481,532

UNITED STATES PATENT OFFICE 2,481,532

PROCESS OF MAKING MUSTARD GAS RESISTANT FABRIC

Irving Pöckel, Wellesley, Mass.

No Drawing. Application October 5, 1942, Serial No. 460,817

1 Claim. (Cl. 117—76)

(Granted under the act of March 3, 1883, as amended April 30, 1928; 370 O. G. 757.)

The invention described herein may be manufactured and used by or for the Government for governmental purposes, without the payment to me of any royalty thereon.

This invention relates to material particularly adapted to be used in making clothing and other articles which will be resistant to penetration by liquid mustard gas, lewisite, and other vesicants encountered in chemical warfare. The material is also adapted to be made into many commercial waterproof articles such as raincoats, shower curtains, food bowl covers, etc. The invention also relates in part, to certain resin compositions used in treating fabric to make vesicant-resistant material.

In order to afford exposed personnel complete protection against vesicant agents used in chemical warfare it is necessary that they be provided with clothing and garments made from material which will resist penetration by the vesicant agents for adequate periods of time. This same type of material is also suitable for other similar uses such as for dugout curtains, and tarpaulins, for covering food and matériel.

Although materials have been provided heretofore which were resistant to penetration by vesicant agents, such as liquid mustard and lewisite, such materials have not been completely satisfactory in all respects. Accordingly, the principal object of this invention is to provide improved material adapted to be used in making clothing and other articles which will resist penetration by chemical warfare vesicant agents, which is characterized by having the following desirable features:

(a) High resistance to penetration by mustard, lewisite and other vesicants.
(b) Waterproofness which will withstand repeated washings.
(c) Good flexibility through a wide temperature range.
(d) Freedom from undue tackiness over long periods of time and in storage under humid atmospheric conditions.
(e) Capable of being easily fabricated into various articles such as protective hoods, clothing, dugout curtains and tarpaulins.
(f) Made from readily available inexpensive, non-strategic, ingredients.

A further object of this invention is the provision of novel resin compositions, particularly adapted for use in treating fabric to make material which is resistant to chemical warfare vesicant agents.

Other objects of the invention will, in part, be obvious and will in part appear hereinafter.

For a more complete understanding of the nature and scope of this invention, reference may be had to the following detailed description thereof setting forth, by way of illustration, certain specific types of vesicant-resistant materials and resin compositions.

It has been found that material may be provided which is superior for use in making clothing and other articles which are resistant to penetration by mustard, lewisite and other vesicants, by treating or impregnating suitable fabrics or clothing with a class of resins made by the interaction through heat of (1) a polyhydric alcohol, (2) a drying oil fatty acid, and (3) a straight chain dibasic acid having six or more carbon atoms in the chain. Glycerol, ethylene glycol and diethylene glycol are illustrative of the polyhydric alcohols that may be used. Linseed oil fatty acids and dehydrated castor oil fatty acids, are illustrative of drying oil fatty acids that may be used. And, adipic acid, pimelic acid, suberic acid, azelaic acid, and sebacic acid, are illustrative of the straight chain dibasic acids which may be used. Certain other ingredients may or may not be included with the foregoing basic components.

In making vesicant-resistant material according to the invention a resin of the above described class may be dissolved in a suitable volatile solvent to form a solution thereof. Mineral spirits and xylol are illustrative of solvents that may be used. Pigment may be ground into the resin solution as desired and suitable drying agents may be added thereto. The solution may be applied to suitable fabric or cloth and allowed to dry and cure with the aid of heat. In curing, the solvent evaporates leaving the fabric coated or impregnated with a layer consisting essentially of the particular resin used in making up the solution. Any desired number of layers may be built up on the first layer by repeated application of the resin solution followed by drying. The particular use to which the material is to be applied and the length of time which it must resist mustard and other vesicants will determine the composition and number of the layers required.

As stated above, the resin compositions of this invention consist essentially of the interaction or condensation products of (1) polyhydric alcohol, particularly glycerol, (2) a drying oil fatty acid, and (3) a straight chain dibasic acid having six or more carbon atoms in the chain. However, this resin composition may be modified by the inclusion of other dibasic anhydrides and acids such as phthalic anhydrides, and malic anhydrides. Certain monobasics may be included, as benzoic acid, lauric acid, castor oil fatty acids, cottonseed oil fatty acids, stearic acids, etc. Certain non-drying oils may be included, such as castor oil and cottonseed oil, and other resin material may be included such as chlorinated rubber, ethyl cellulose, and nitrocellulose.

The following examples will serve to illustrate to those skilled in the art several embodiments of the invention:

Example 1

50 lbs. of phthalic anhydride, 50 lbs. of sebacic acid, 100 lbs. of dehydrated castor oil fatty acids, and 58½ lbs. of glycerol were placed in a stainless steel container and heated to 490° F. in one hour, and maintained at this temperature for one and one-half hours. The resin was then thinned with 24 gal. of mineral spirits. Pigment (for coloring the fabric to Army specification) was ground into this resin solution, and cobalt naphthenate and lead naphthenate were added. A sample of cotton cloth weighing about 3½ oz./yd.$^2$ was impregnated with this coating and cured for 16 hours at about 150° F. The finished fabric had an overall weight of 6¾ oz./yd.$^2$, and garments prepared from this fabric would resist penetration of liquid mustard gas for more than one hundred minutes.

Example 2

67 lbs. of phthalic anhydride, 53 lbs. of sebacic acid, 121 lbs. of linseed oil fatty acids, and 70 lbs. of glycerol were placed in a stainless steel container and heated to 490° F. in one hour and maintained at this temperature for 1½ hrs. The resin was then thinned with 19½ gal. of mineral spirits. Pigment was ground into this resin solution, and cobalt naphthenate and lead naphthenate were added. A sample of cotton cloth weighing about 3½ oz./yd.$^2$ was impregnated with this coating and cured for 16 hours at about 150° F. The finished fabric had an overall weight of 6⅓ oz./yd.$^2$ and garments prepared from this fabric resisted the penetration of liquid mustard gas for more than one hundred minutes.

Example 3

45 lbs. of sebacic acid, 55 lbs. of linseed oil fatty acids, and 25 lbs. of glycerol were placed in a stainless steel container and heated to 465° F. and maintained at that temperature for 1½ hours. The resin was then thinned with 7½ gal. of mineral spirits. Pigment was ground into this resin solution and cobalt naphthenate and lead naphthenate were added. A sample of cotton cloth weighing about 3⅓ oz./yd.$^2$ was impregnated with this coating and cured for ½ hour at 290° F. The finished fabric had an overall weight of 6¾ oz./yd.$^2$, and garments prepared from this fabric resisted the penetration of liquid mustard gas for more than ½ hour.

Example 4

482 gms. of azelaic acid, 717 gms. of linseed oil fatty acids, and 297 gms. of glycerol were placed in a glass container, and heated to 455° F. in one hour, and maintained at this temperature for 2½ hours. The resin was thinned with 316 gms. of "Solvesso #2" solvent. Pigment was ground into this resin solution and cobalt naphthenate and lead naphthenate were added. A sample of cotton cloth weighing 4½ oz./yd.$^2$ was impregnated with this coating and cured for ½ hour at 280° F. The finished fabric had an overall weight of 14¾ oz./yd.$^2$, and garments prepared from this fabric resisted the penetration of liquid mustard gas for more than 1½ hours.

Example 5

32½ lbs. of adipic acid, 55 lbs. of linseed oil fatty acids and 25 lbs. of glycerine were placed in a stainless steel container and heated to 465° F. and maintained at that temperature for about one hour. The resin was then thinned with 7 gallons of xylol. Pigment was ground into this resin solution and cobalt and lead naphthenate driers were added. A sample of cotton cloth impregnated with this coating and cured one half hour at 290° F. resisted the penetration of liquid mustard gas for more than one hour.

Although in the foregoing examples cotton fabric was impregnated in each instance, it will be understood that other types of fabric or cloth could be used such as fabrics made from silk, and from synthetic fibres such as rayon.

It will be understood that the cobalt and lead compounds mentioned in the foregoing examples, function as driers. Other metal compounds could be used for the same purpose, such as manganese naphthenate.

According to the presently preferred procedure, a coating is built up on the base fabric by successive applications of resin, allowing each layer thereof to dry and cure before the application of the succeeding layer. For example, a very excellent fabric may be obtained by base coating a fabric with a resin made according to Example 3 above, and then applying, as a top coat, a composition made in accordance with Example 1. The resin of Example 3, being quite flexible, aids in imparting flexibility to the finished fabric, while the resin composition of Example 1, being stronger and tougher, gives a better surface to the finished material.

Tests have indicated that vesicant-resistant material made according to the present invention is equal or superior to "Neoprene" coated fabric of comparable grade, which latter type of vesicant-resistant material has been heretofore considered to be one of the best available.

In addition to the suitability of fabric prepared in accordance with the teaching of this invention for military purposes, as described above, such fabrics may be used to prepare superior articles of commerce such as: raincoats, shower curtains, food bowl covers, umbrellas, slickers, window curtains, cap protectors, waterproof cable wrappings, and the like. The following examples illustrate the preparation of fabric for such uses:

Example 6

The clear resin prepared according to Example 3 above with a small amount of cobalt naphthenate as drier was used to impregnate a sample of 1 oz./yd.$^2$ silk fabric to an overall weight of about 2½ oz./yd.$^2$. The coated fabric was cured for twenty-five minutes at about 270° F. A light colored, waterproof, highly flexible, rubber-like fabric was obtained. From this coated fabric shower curtains of superior quality were prepared.

Example 7

The fabric prepared from a medium weight cotton sheeting by applying base coat of the resin prepared according to Example 1 above and a top coat of the resin prepared according to Example 3 above has been made up into raincoats. Such raincoats are superior to the oil type slickers in that they will not become tacky under humid conditions, are more flexible at low temperatures, are not subject to spontaneous combustion and are more resistant to abrasion.

Since certain changes and modifications may be made in the foregoing embodiments, compositions, and methods of preparations, without departing from the scope of the invention, it is intended that all matter contained in the above description shall be interpreted as illustrative and be given a construction as broad as is consistent with the state of the prior art.

I claim:

The process for impregnating a fabric with coatings resistant to mustard gas in its liquid phase, and to other vesicants, that includes the following steps: heating together 50 parts by weight of phthalic anhydride, 50 parts by weight of sebacic acid, 100 parts by weight of dehydrated castor oil fatty acids, and 58½ parts by weight of glycerol; raising the temperature of said first mixture to about 490° F. in about one hour; maintaining said first mixture at said temperature for about one and one-half hours; applying said first mixture to said fabric as a base coating thereon; preparing a second mixture comprising 45 parts by weight of sebacic acid, 55 parts by weight of linseed oil fatty acids, 25 parts by weight of glycerol; heating said second mixture to a temperature of about 465° F.; maintaining said second mixture at said last named temperature for about one and one-half hours; and subsequently applying the resin resulting from said second mixture over said base coating on said fabric.

IRVING PÖCKEL.

REFERENCES CITED

The following references are of record in the file of this patent:

UNITED STATES PATENTS

| Number | Name | Date |
| --- | --- | --- |
| 1,783,168 | Bruson | Nov. 25, 1930 |
| 2,060,665 | Furant et al. | Nov. 10, 1936 |
| 2,316,099 | Myers | Apr. 6, 1943 |
| 2,348,740 | Jennings | May 16, 1944 |